March 26, 1935.                A. S. MERMIGIS                1,995,548
                           GREASE RETAINING BUSHING
                              Filed Feb. 26, 1934
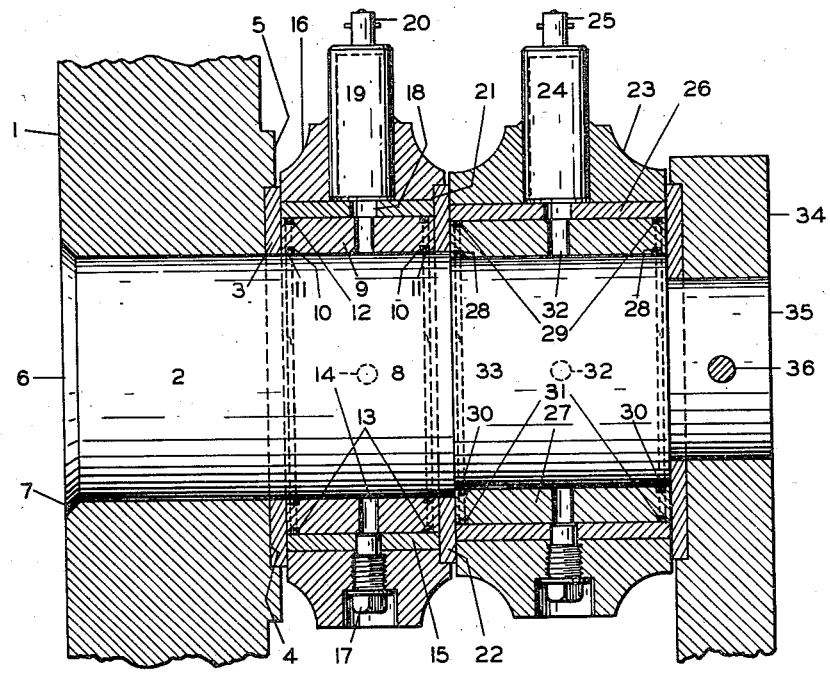
FIGURE 1.
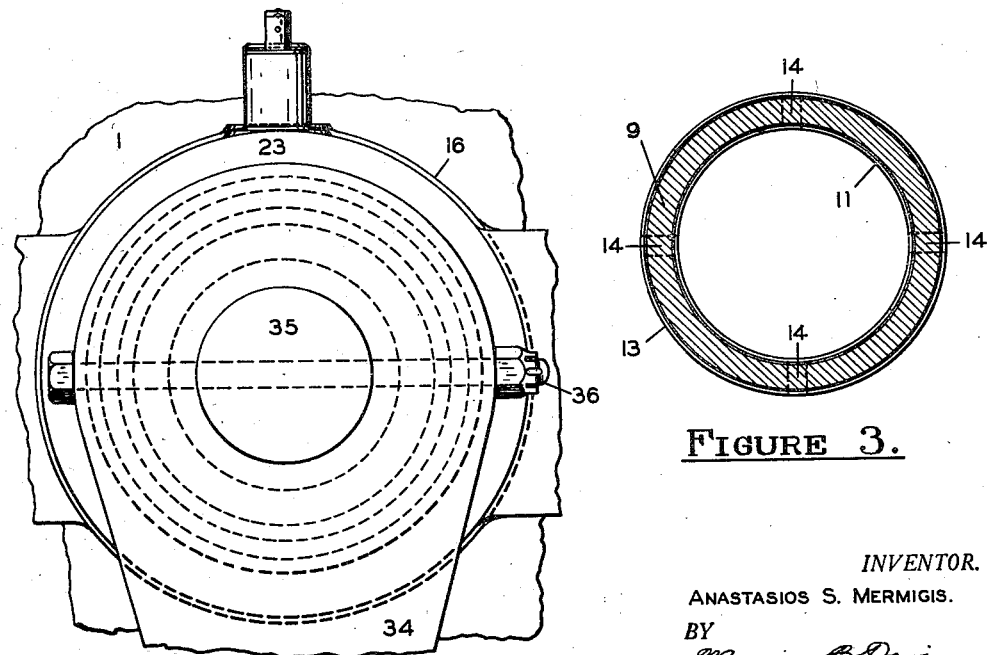
FIGURE 2.
FIGURE 3.
INVENTOR.
ANASTASIOS S. MERMIGIS.
BY
Marvin B. Davis
ATTORNEY Patented Mar. 26, 1935

1,995,548

UNITED STATES PATENT OFFICE 1,995,548

GREASE RETAINING BUSHING

Anastasios S. Mermigis, Kansas City, Kans.

Application February 26, 1934, Serial No. 712,977

4 Claims. (Cl. 308—240)

This invention relates to grease retainers for locomotive main rods and side rods and the like, and has for its object a combination of parts that will retain grease in the journal bearings under high pressure without altering the journals, or rods with steel bushings.

Heretofore the main bearings and side rod bearings were provided with steel bushings, and full floating bronze bushings that were free to turn in the steel bushings and on the journals. Grease was forced in the journal bearings with a high pressure grease gun, but when the locomotive left the round house or place of greasing the grease immediately began to squeeze out of the bearings and great chunks of grease would fall to the track bed and become wasted. The bronze bushings were drilled with many holes to help retain the grease but as soon as one of the bushings became hot from the severe loads that were thrust against it the grease would immediately melt and run out and the result remained that the bearing would hammer and wear rapidly for want of more grease. Furthermore the increased number of holes reduced the bearing area and increased the bearing pressure per square inch.

Grease retainers are old on many types of machinery bearings where special shafts and housings are designed to receive the retainers. There are shafts with fixed collars grooved to receive the grease retainer rings, and ball bearings with grease retainer rings set in the races on each side of the balls, therefore such designs demand a longer bearing than required for actual bearing surface. A still further objection to such type of bearings is that the shafts must often be larger in diameter due to the increased bending moments between the necessarily greater distances of bearing centers.

An object of the present invention is to provide a full floating bushing with annular grooves near the ends thereof to receive rings to seal the bearing against leakage of grease in combination with well known step cut rings such as are used for various machinery, except the bushing outside rings are expanding and the inside rings are compressing rings. This invention will not increase the length of bearing or alter the shaft and steel bushing mounted in the boss of the bearing.

With these and other objects in view the invention further consists of the accompanying illustrated drawing and the following specification and claims.

In the drawing:

Figure 1 is a fragmentary view of locomotive side rod and main rod bearings illustrating the improved bushings and rings to retain grease.

Figure 2 is an end view taken from the right end of Figure 1.

Figure 3 is a fragmentary view illustrating the improved bushings, internal and external rings.

The locomotive wheel boss 1 receives the tight fitting shaft portion 2, and the thrust ring 3 mounted in the recess 4 of the face 5. The end 6 of the shaft is enlarged after passing through the boss 1 and riveted tightly against the beveled face 7. The thrust collar 3 is loosely mounted on the shaft to allow the shaft to turn therein.

The portion of the shaft 8 receives the improved bushing 9 loosely fitted thereto. The bushing contains two annular grooves 10 in the bore thereof and receives the two rings 11. The bushing 9 also contains two annular grooves 12 in the external surface thereof and receives the two rings 13. The grooves and rings are arranged as near the ends of the bushing as possible and leave sufficient metal beyond the ring to retain it. The bushing contains four grease holes 14 arranged to allow the grease to flow from the external surface of the full floating bushing to the bore thereof.

The steel bushing 15 is mounted in the side rod boss 16 and is held in position by a screw keeper 17. A grease hole 18 in the steel bushing allows the grease to pass from the grease cup 19 of the boss 16 to the bushing 9. The boss 16 has the grease cup 19 welded thereto and is closed at the upper end thereof by welding an alemite screw fitting 20 thereto, thus allowing the cup to be filled with grease under high pressure.

The side rod 16 contains a recess 21 and receives the thrust collar 22 loosely mounted on the shaft portion 8.

The main rod boss 23 is similar to the side rod in construction but is longer, smaller in diameter, and does not contain a thrust collar recess. The boss 23 contains the grease cup 24, alemite fitting 25, and steel bushing 26. The bushing 27 contains the annular grooves 28 and 29, and rings 30 and 31. The four grease holes 32 are arranged in bushing 27 to allow grease to pass from the external surface of the bushing to the bore thereof. The bushing 27 is loosely fitted to the reduced shaft portion 33.

The eccentric crank arm 34 is mounted on the trunnion 35 and bolted thereto with bolt 36 and operates the valve mechanism of a locomotive. The locomotive and mechanism not being shown because of well known construction.

There are other bearings on the locomotive similar to these shown that can be equipped with applicant's invention and applicant does not wish to restrict the invention to main rod and side rod bearings.

It is obvious that when grease is forced into the cups that it will pass through the grease cups and steel bushings to the full floating bronze bushings, then over the external surface and through the holes in the floating bushings to the bored surfaces thereof. High pressure will force the rings against the shaft and steel bushings and prevent the escape of grease.

What I claim as new and desire to secure by Letters Patent is:

1. A locomotive side-rod boss containing a fixed bushing, a full floating bushing mounted therein, a locomotive wheel, a trunnion shaft mounted therein, said shaft fitted in said floating bushing, annular grooves arranged in the exterior surface of said floating bushing, annular grooves arranged in the bored surface of said floating bushing, expanding rings in the grooves of the exterior surface, compressing rings in the grooves of the bored surface, and means arranged whereby grease may be forced between said rings.

2. In a locomotive bearing the combination of a cylindrical shaped integral bushing, said bushing containing annular grooves in the exterior surface, said bushing being bored longitudinally, said bushing containing annular grooves in the bored surface thereof, expanding rings mounted in the grooves of the exterior surface, and compressing rings mounted in the grooves of the bored surface.

3. In a locomotive bearing the combination of a cylindrical shaped bushing, said bushing containing annular grooves in the exterior surface, said bushing being bored longitudinally, said bushing containing annular grooves in the bored surface thereof, expanding rings mounted in the grooves of the exterior surface, compressing rings mounted in the grooves of the bored surface, and holes through said bushing connecting the exterior surface with the bored surface.

4. In locomotive side rod and main rod bearings, the combination of a locomotive wheel, a trunnion shaft mounted in said locomotive wheel, said side rod and said main rods mounted on full floating bushings, said full floating bushings mounted on said shaft, means to hold said rods in position, and rings arranged in the cylindrical portions of said bushings to prevent grease from passing beyond the ends of the bushings when the bushings and sides of the rods are worn and would otherwise allow grease to escape.

ANASTASIOS S. MERMIGIS.